US012470529B2

(12) United States Patent
McNamara, Jr. et al.

(10) Patent No.: US 12,470,529 B2
(45) Date of Patent: Nov. 11, 2025

(54) PLATFORM AND METHOD FOR AUTOMATED MOVING TARGET DEFENSE

(71) Applicant: Hopr Corporation, Columbia, MD (US)

(72) Inventors: Thomas M. McNamara, Jr., Ellicott City, MD (US); Nicholas M. Hughes, Sykesville, MD (US)

(*) Notice: Subject to any disclaimer, the term of this patent is extended or adjusted under 35 U.S.C. 154(b) by 168 days.

(21) Appl. No.: 18/334,875

(22) Filed: Jun. 14, 2023

(65) Prior Publication Data

US 2023/0328047 A1   Oct. 12, 2023

Related U.S. Application Data

(63) Continuation-in-part of application No. 17/472,799, filed on Sep. 13, 2021, now Pat. No. 11,716,312.

(51) Int. Cl.
| | |
|---|---|
| G06F 7/04 | (2006.01) |
| G06F 15/16 | (2006.01) |
| H04L 9/40 | (2022.01) |
| H04L 29/06 | (2006.01) |

(52) U.S. Cl.
CPC ............... *H04L 63/0435* (2013.01)

(58) Field of Classification Search
CPC .................................................. H04L 63/0435
USPC ............................................................. 726/6
See application file for complete search history.

(56) References Cited

U.S. PATENT DOCUMENTS

| | | | |
|---|---|---|---|
| 9,590,958 B1* | 3/2017 | Howell | G06F 21/6218 |
| 2021/0266303 A1* | 8/2021 | Pollutro | H04L 63/0435 |
| 2021/0281548 A1* | 9/2021 | Ackerly | H04L 67/60 |

* cited by examiner

*Primary Examiner* — Jeffrey C Pwu
*Assistant Examiner* — Samuel Ambaye

(57) ABSTRACT

The present invention is a system and method for machine-to-machine communication in a Zero Trust environment. The instant invention describes a platform implementation that disables threat actors and their methods that target workload credentials. The platform is an Automated Moving Target Defense (AMTD) platform that creates sidecars that contain algorithms for creating secure keys from user specified dynamic elements, a machine alias ID (MAID), an encryption library, and an envoy proxy. The sidecars are utilized to control access to, and secure messaging traffic between, entities in a non-trusted environment.

7 Claims, 8 Drawing Sheets

PLATFORM AND METHOD FOR AUTOMATED MOVING TARGET DEFENSE

CROSS-REFERENCE TO RELATED APPLICATION

This application claims the benefit of priority of U.S. Non-Provisional application Ser. No. 17/472,799 filed Sep. 13, 2021, entitled "Platform for Optimizing Secure Communications" which is herein incorporated in its entirety.

BACKGROUND

APIs come in several different forms known by acronyms such as REST, HTTP, and GRAPHQL. Whatever the form, APIs receive "request" messages from a Client who presents an "API" key with the request. After confirming the authenticity of the key and that the Client is authorized to obtain the requested data, the Server (API endpoint) replies to the Client with the requested data.

APIs are the backbone of cloud services that share data to perform a wide range of business functions. They connect applications, services and microservices, and this makes them an attractive target for threat actors seeking to steal private data, or sniff the message traffic for keys, credentials, and sensitive data to use in a more aggressive and elaborate attack.

The growth in API attacks is alarming. They are now the largest application vulnerability point for digital business operating in the cloud. In a recent survey of digital enterprises reliant on APIs, 94% of respondents cited a security issue with their APIs over the last year. These issues included vulnerabilities (41%), authentication (40%), sensitive data exposure (31%), and security breaches (17%). These events result in significant costs and reputational damage for enterprises.

API attacks can be launched by threat actors outside the business, but also by threat actors that have penetrated the perimeter network security and are operating undetected inside the business network whether they be on-premises of in a cloud environment. Insider attacks are considered "Man-in-the-Middle (MITM) attacks and cover a wide range of methods, including sniffing message traffic between workloads as a workload flows over unsecured networks. The main reason that these networks remain unsecured is overconfidence by business security professionals in the strength of their perimeter security. The SolarWinds hack discovered in December 2020 made it clear that even the most sophisticated security environments can be penetrated by threat actors who may operate for several months without detection. Significant and extensive losses resulted from the SolarWinds event and resulted in a Presidential Executive Order for Zero Trust.

BRIEF DESCRIPTION OF THE DRAWINGS

Certain illustrative embodiments illustrating organization and method of operation, together with objects and advantages may be best understood by reference to the detailed description that follows taken in conjunction with the accompanying drawings in which.

DETAILED DESCRIPTION

Figure 1:
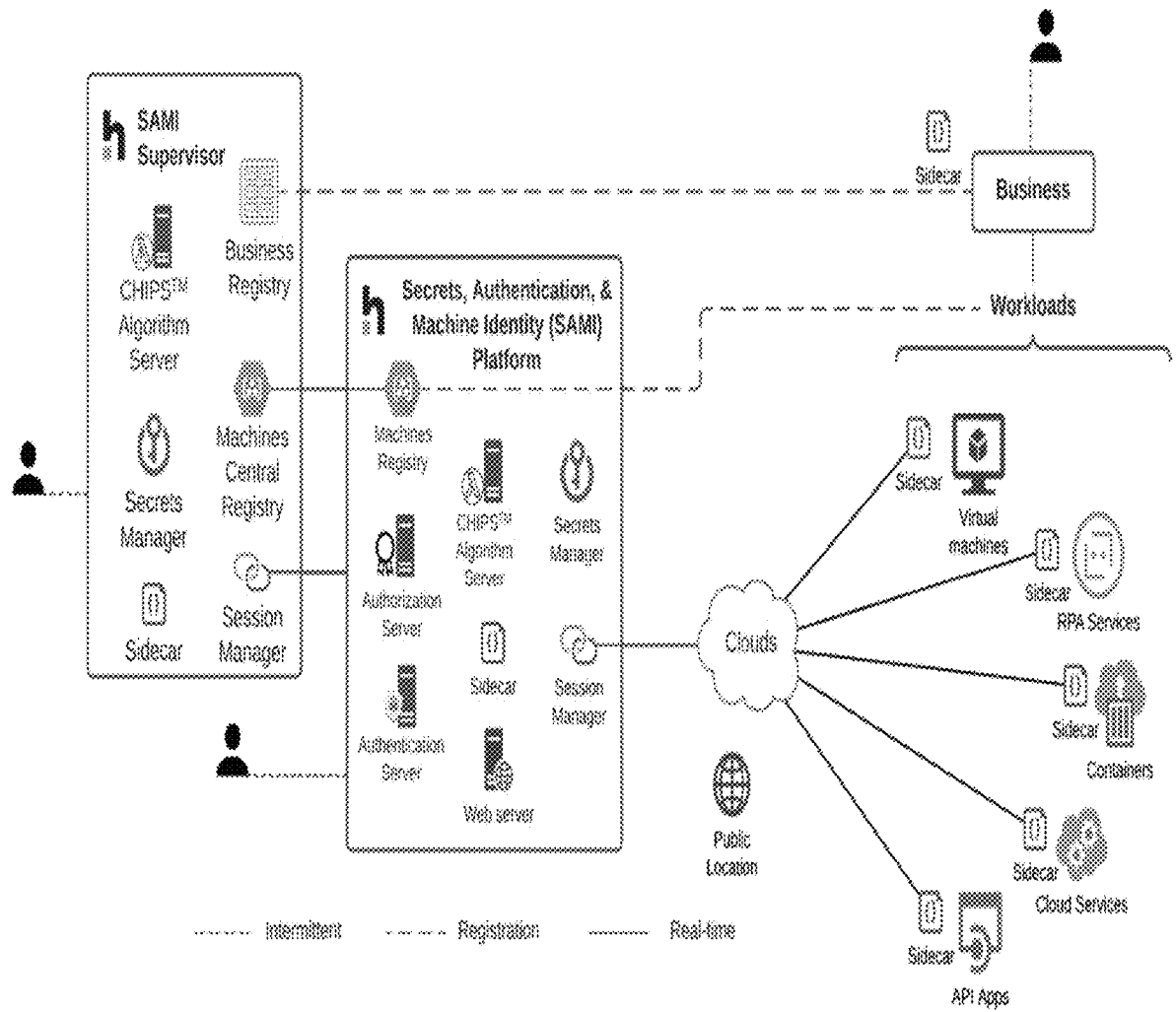
FIG. 1 this figure presents an illustration of the top-level technical architecture of the instant innovation's Secrets, Authentication, and Machine Identity (SAMI) system consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The terms "paired" and/or "coupled", as used herein, is defined as connected, although not necessarily directly, and not necessarily mechanically.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

Reference throughout this document to "device" refers to any electronic device with network communication access such as, but not limited to, a cell phone, smart phone, tablet, iPad, networked computer, internet computer, laptop, watch or any other device, including Internet of Things devices, a user may use to interact with one or more networks or represent an endpoint of user interactions.

Reference herein to "Hopping" refers to a method of automated random-password generation and serial substitution at specified time intervals. The process of "Hopping" as described herein is based upon a hopping algorithm comprised of a specified time interval and a set of specified construction and transformation rules that employ, among other variables, easily available time-variable data sources as providers of randomized inputs. Use of randomized inputs heightens the security of resulting generated passwords.

Throughout this document the terms "dynamic data," "dynamic information," and "time-variable data" are used interchangeably.

Reference herein to "Algorithm Registry" refers to a registry that contains all CHIPS algorithms and users (i.e. Company UIDs) associated with the use of the CHIPS algorithms.

Reference herein to "Authorization" refers to the permissions and privileges (authorities) granted to identities to access data or operate machines in a cloud computing environment, including, but not limited to, authorities to trust certain machines and configure and install software.

Reference herein to "CHIPS™" refers to the acronym standing for, "Codes Hidden In Plain Sight" and applies to a proprietary computer security method using dynamic information hidden in plain sight to construct a dynamic password or similar key or "secret". Reference to the "container repository" refers to a digital repository that stores containers (e.g. Kubernetes, Docker) and delivers Sidecar container images, licenses and YAML (a data interchange protocol) files to registered users.

Reference herein to "Endpoint" refers to a digital address for a workload operating in the cloud, such as a URL or URI, IP address and port that may be used by an API workload to receive requests for services.

Reference herein to "Ephemeral Symmetric Secret" refers to a symmetric key built from a CHIPS algorithm. The secret "hops," or changes, each time a session begins. The Ephemeral Symmetric Secret encrypts only communication between two specific workload Sidecars that are configured to use the same CHIPS algorithm.

Reference herein to "Identity" refers to a specific human, business, computing infrastructure, application, or service that interacts with one or more other humans, businesses, computing infrastructures, applications, or services. An Identity is an entity that possesses a credential by which its authorities can be determined and trusted by an external entity.

Reference herein to "Logging" refers to the recordation of all activity in the AMTD Platform.

Reference herein to "Ledgers" refers to the recordation of all activities associated with workload and session use (metering of sessions as they occur) associated with users such as a company UID.

Reference herein to "Machine" refers to a class of cloud computing and infrastructure hardware and software items that possess Identity. A machine may be any one of: applications, services, containers, virtual machines, and devices or Special Devices that interconnect in a cloud computing environment.

Reference herein to "MAID Registry" refers to a MAID registry that maintains a list of all registered sidecars/workloads and the owner associated with the company UID.

Reference herein to "Secret" refers to a password, pin, token, key or any string of printable characters whose possession is used to prove an authenticated identity and must be kept secret by the authorized users.

Reference herein to "Session" refers to a series (either synchronous or asynchronous) of machine-to-machine interactions that occur for a specific purpose and limited period of time. Sessions are initiated and terminated by either of two participating Identities.

Reference herein to "Session Token" refers herein to a key that encrypts messages between two specific machine Sidecars during a session. The key has a limited lifetime and is issued simultaneously to each of the two machine Sidecars.

Reference herein to "Sidecar" refers to lightweight plugin code that resides with and connects to a workload to perform the SAMI functions at the workload endpoint and interoperate between the workload, other trusted workloads, and the SAMI platform that is acting as a Session Manager.

Reference herein to the "Web Server" refers to a web page publisher component that publishes web pages with random high entropy dynamic elements at a variety of URLs, each of which is associated with an organization. The contents of each web page are removed and republished with new dynamic content at a high frequency (such as, in a non-limiting example, where the publication interval is 1 minute or less).

Reference herein to "Workload" refers to a generic category of functioning machines and software in temporary operation within cloud computing. For example, an application running on a container in a cloud data center is a workload.

Reference herein to "Zero Trust" refers to an evolving set of cybersecurity paradigms that assumes existence of insider threats and move defenses from static, network-based perimeters to focus on users, assets, and resources that operate within a network. The Zero Trust approach advocates mutual authentication, including verifying and checking the identity and integrity of Special Devices without respect to location, and providing access to applications and services based on the confidence of Special Device identity and Special Device health in combination with user authentication.

Reference herein to "Secret Zero" refers to a human computer systems administrator with one or more passwords.

Reference herein to the term "SAMI" refers to an acronym for "Secrets, Authentication, and Machine Identity," and is a top-level reference for the instant innovation including management and rotation of machine identities, management and rotation of machine secrets, brokering and managing end-to-end encrypted sessions between machines in various public and private clouds and symmetric encryption of inter-machine communications.

The instant innovation disables threat actors and their methods that target workload credentials and gain unauthorized access to critical resources within business networks. The innovation herein described addresses six of the seven zero trust principles identified by NIST and meets the preinciple with a combination of features that produce an Automated Moving Target Defense (AMTD) to protect workloads, APIs, and data in transit. The CHIPS algorithm and protocol for machines, the Machine Alias ID (MAID) are disclosed and described in patent application Ser. No. 17/472,799, from which this application claims priority. The innovation herein described extends the '799 Application to present new capabilities and enhanced features.

The AMTD system as herein presented is an enhanced optimization of the SAMI system presented in the '799 Application. The AMTD system is optimized to be implemented utilizing fewer components that leverage existing cloud infrastructure services, such as, in a non-limiting example, the Open Source Envoy implementation later discussed. The architecture of the instant innovation is divided into two main parts—an AMTD Platform and a user-deployable Sidecar (thin client).

In a cloud computing environment, the purpose of authentication is to establish trust as machines connect with each other automatically; critical business operations are moving from on premises data centers to the cloud where the traditional security perimeter and defense tools are ineffective. Consequently, there is a need for a "Zero Trust" approach to assure cloud operations are authorized and secure by authenticating machine identities.

Zero Trust principles are difficult to implement when there are thousands of containers that are initiated to meet peak periods and/or short-term demand from application users. There are several shortcomings with existing solutions:

- Secrets rotation in the cloud is limited to services within individual cloud vendors (e.g. Amazon Web Services Secrets Manager). There is no feasible method for high trust cross-cloud rotation of machine secrets;
- The existing methods of secrets rotation for machines is rudimentary. Secrets are "leased" at creation. Rotation must be triggered by an administrator or programmatically when they expire. There is no real-time method for secrets rotation and they are rotated only when machines are in a maintenance mode. No capability for real-time operational synchronization of symmetric secrets across clouds exists;
- Machine secrets are often stored in centralized "secrets stores" (vaults) for protection, but this creates another set of credentials (the keys to the vault) which must then be protected. This creates a chain of secrets stores that eventually leads back to a human administrator with a password (known as Secret Zero). No existing solutions address the Secret Zero problem;
- Machine identities are based on asymmetric key material (public and private cryptographic material). Identity "certificates" are automatically issued by many possible vendor "authorities" that form a chain of trust among the authorities, but are difficult to certify with external authorities and create multiple private keys which must be protected; and
- Existing solutions are complicated and require extensive manual configuration buy DevOps personnel for proper operation. They are prone to human error and impede the automation process required for DevOps pipelines.

In an embodiment, the instant innovation uses several critical management functions, including the management and rotation of machine identities, the management and rotation of machine "secrets," the brokering and management of sessions between machines in various public and private clouds, and the symmetric encryption of inter-machine communications.

In an embodiment, the instant invention follows the Kerberos 3-party design pattern. The SAMI Platform operates as a trusted third party between two or more workloads to broker and manage security, identity, connections, sessions, and secrets in a Zero Trust cloud environment. This is similar to the PHS operating as a trusted party between a business and its customers.

In an embodiment, the instant innovation uses the CHIPS™ protocol as a steganographic approach to providing two endpoints with an identical secret without sharing that secret with either endpoint. For machines operating within a managed cloud environment, two machines are trusted and share an algorithm that defines a publicly available location of dynamic digital information and the location of dynamic content at that location. Both machines possess the same algorithm and may independently visit the public location at nearly the same time and retrieve the same dynamic elements and may modify and assemble them in the same way (per the algorithm) to create the identical ephemeral symmetric secret at each endpoint.

The secure storage of keys in a digital environment creates a new key that must be secured itself, but securing this key starts a chain event in which that security method requires authentication of an identity and a proof (such as a password or another key.) Ultimately this chain ends at a root identity of a person or machine that owns the final 'key' or password. This root identity is referred to as Secret Zero. In an embodiment, of the instant innovation, Secret Zero is an algorithm instead of an administrator. The instant invention replaces these keys, which are strings of printable characters, with an algorithm. The algorithm contains a public part (the public location) and one or more secret parts (the location of the dynamic elements). The algorithm relies on the Codes Hidden In Plain Sight (CHIPS) steganographic protocol.

In an embodiment, the CHIPS™ algorithm is inert until the time of processing and needs a computer to produce an ephemeral symmetric secret. Unlike typical secrets that can be scanned in code and identified by their characteristics and randomness. CHIPS™ algorithms are impervious to detection by scanning. The CHIPS™ algorithm is accompanied by an additional part that was not present in the PHS formula. The new part requires the input of variable information in the form of a machine ID alias that can only be known by the machine itself cannot be known before an authentication session is started by a machine identity; the variable information is a derivative of the prior session history (as tracked on a ledger) for the machine. If an attacker were to obtain the CHIPS™ algorithm and create an ephemeral symmetric secret, it could not be successfully used because it must be use with a second credential—the machine ID alias. This ensures that ephemeral symmetric secrets can only be used by the legitimate authorized identity.

In an embodiment, the CHIPS™ algorithms have improved security because they are retained in a large (tens of thousands) obfuscated library within a Sidecar and a single algorithm from the library is selected at the time of Sidecar configuration and deployment. They always remain within the identity for which they have been created and are protected by micro-vaulting and compiled code. The CHIPS™ algorithms remain within the Sidecar and are never exposed or transmitted.

In an embodiment, the CHIPS™ algorithm is tamper resistant. Because the CHIPS™ algorithm is established once at configuration and stored in two locations (by way of non-limiting example, in the SAMI Secrets Manager and the Sidecar) an attacker must change both algorithms at the same time to avoid detection. The change of just one algorithm creates different ephemeral symmetric secrets and authentication fails. Failed authentication is evidence of possible algorithm tampering and causes a security alert to operators.

In an embodiment, the instant innovation uses Self-Rotating Ephemeral Symmetric Secrets. Rotation of secrets is usually performed by commercial Secrets Managers with static secrets given a "lease" period and a "time to live" value when they are created or invoked from a secrets store. These are essentially manually configured to programmatically expire and must then be replaced (sometimes programmatically). The instant innovation's use of the CHIPS™ algorithm (i.e., the Algorithm Server) and the CHIPS protocol ensure that the symmetric secrets generated are naturally ephemeral and self-rotate at an unpredictable cycling of the dynamic elements and public locations used by the CHIPS™ algorithm. Ephemeral symmetric secrets rotate naturally and require no additional configuration after the CHIPS™ algorithm is selected from the library of possible algorithms.

In an embodiment, the instant innovation uses Standardized Sidecar Security. The use of common executable code as Sidecars that can be placed within cloud applications and services improves security because it lessens the need for custom configuration and security vulnerabilities. All necessary security features are designed-in, built-in, and code-signed to ensure the Sidecar is tamper-proof. Interfaces are only allowed with a specific workload identity, other SAMI Sidecars and the SAMI Session Manager.

In an embodiment, the instant innovation uses Decentralized Secrets Stores. Normally. machine secrets are centrally stored and protected with encryption in a central vault. The vault requires strong security and it stores many secrets that are deposited and withdrawn when needed. This creates an attractive target that is easy for attackers to identify and find, and is high value. In addition, the vault has the Secret Zero problem because it must be sealed and unsealed with other credentials. Unlike current Secrets Managers and vaults where keys for an app are withdrawn from the vault by an application (which must provide an authentication token), the SAMI approach uses decentralized secrets stores (micro-vaults) located and protected within Sidecars that reside with each machine. The micro-vaults are encrypted and secured with session specific credentials that rotate each session. They distribute secrets across the attack surface and reduce the likelihood of secrets detection, as well as reduce the losses from a successful attack.

In an embodiment, the instant innovation uses Centralized Session Brokering and Management. Zero Trust principles require authentication of identities and authorizations at every interaction. The Session Manager of the instant innovation uses the ephemeral symmetric secret of each workload at the start of each session to authenticate workload identities. It also uses the Authorization Server and the resource Sidecar to broker session permissions and rules for risk-based trust levels, and it sets the session lifetime and issues the session token for secure operations.

In an embodiment, the instant innovation uses Self-synchronizing ephemeral symmetric secrets following a Synchronous Ephemeral Encryption (SEE™) protocol. Because it is very difficult to securely provide a symmetric secret to two cloud endpoints at the same time and during operations, the timing necessary for synchronizing rotating keys in cloud computing must be very accurate. The instant innovation's SEE™ protocol and Session Manager brokering ensures that workload ephemeral symmetric secrets self-synchronize with the Session Manager or another Sidecar (in the use case of communication between trusted workloads with identical CHIPS™ algorithms within a managed network) at the start of each session. The Session Manager also issues the ephemeral session token to both Sidecars at the same time with lifetime data in the encrypted message to ensure token synchronization throughout the session.

In an embodiment, the instant innovation uses Resource-Governed Access Control. Resource servers govern access permissions and policies with a Client machine on a 'per session' basis based upon the machine identity and history with the resource. The longer the successful history of transactions, as represented by the machine ID alias, the more trust the resource may bestow on the client. The resource owner may use current threat conditions to elevate security policies per machine identity and their experience with the identity. Resource owner policies govern sessions with clients; on-demand Zero Trust after initial registration is the default operational condition.

In an embodiment, the instant innovation uses Nested identities. Identities are nested as parent-child in a hierarchical structure. Identities extend the trust from the parent identity to a child identity at registration only. The one-to-many relationship (a business may have many services or apps) creates identity families, or segments, and Zero Trust can be configured to begin at any hierarchical level. At the lowest level, Zero Trust requires workload identities to authenticate to each other for any session to begin.

In an embodiment, the instant innovation uses an Identity Trust Chain. The use of machine aliases built from a history of machine sessions (ledger) with other machines creates an identity that is immutable and trustworthy. As each new session occurs the session is added to a session ledger. This creates an identity chain, or blockchain, and a verifiable chain of machine alias IDs that validates trust in the machine identity at each session.

In an embodiment, the instant innovation uses a Self-rotating Identity Alias. The machine ID alias is initialized by the SAMI Platform when a Sidecar performs the first session after deployment with its host workload. The SAMI Platform provides the initial (original) ID to the Sidecar at the first session and thereafter the machine ID alias is managed and rotated within the Sidecar. As a machine conducts sessions with other machines, the Sidecar rotates its machine alias ID (at a defined number of sessions or an expiration of a defined time period) to a new alias derived from its original machine ID alias, one or more of its previous machine ID aliases, its current machine ID alias, and time. This makes the identity credential dynamic and improves security when it is verified as trustworthy at the start of each session. The identity alias ID does not need to be kept secret.

In an embodiment, the instant innovation uses Identity Proofing. The metadata (such as, by way of non-limiting example, the transaction pattern from a single session) for a series of machine sessions creates an identity characteristic that reinforces the initial identity. Pattern analysis reveals anomalous session transaction patterns that may occur from unauthorized use. Pattern mismatches produce security alerts to operators.

In an embodiment, the instant innovation is Cloud Agnostic. The use of rotating secrets for machine authentication is an existing practice, but it is limited to services within a vendor cloud (e.g., AWS, Microsoft Azure) in which the application or services exist. AWS Secrets Manager can rotate secrets for its service and Azure can rotate secrets for its services, but they cannot rotate secrets in each other's cloud. The SAMI platform design is not constrained to a single cloud. It can rotate secrets for services in any cloud.

In an embodiment, the instant innovation uses a Synchronous Ephemeral Encryption protocol to establish end-to-end encryption between two workloads without a key exchange. The two workloads can be located anywhere on the Internet. All messages are symmetrically encrypted at workload endpoints (via Sidecars), and at the SAMI Session Manager. Message contents remain secret in transit.

In an embodiment, the instant innovation uses Just-in-Time Access. The method of identity management and session brokering enables two workloads to automatically establish "on-demand Zero Trust" connection with one another at operational scales and timing of cloud computing.

Trust (registration) with the SAMI Platform at registration is all that is needed for two workloads to interoperate securely with Zero Trust principles.

In an embodiment, the instant innovation uses Interlocked Authentication Credentials. The rotation (hopping) of the machine ID alias credential is interlocked with the hopping of the ephemeral symmetric secret, although the rotation of the ID and the secret may occur on different cycles. A session cannot occur without having the hopped machine alias ID, and the hopped machine alias ID can only be built from the history of sessions in the session ledger. Neither workload credential (identity and secret) can be known or predicted beforehand.

In an embodiment, the instant innovation's Streamlined DevOps saves time. The architecture of the SAMI service uses pre-configured Sidecars as a "plug and plan" code package that is easily configured (in a non-limiting example, for the specific CHIPS algorithm) installed by DevOps persons in place of the current practice of installing an API key, for example. This minimizes DevOps workload, avoids configuration errors, and improves security.

AMTD System Platform

The AMTD platform enables trusted connections between Sidecars operating with user workloads. The Platform may include a web server, a MAID registry, and a Kerberos version of a sidecar (commercially described as 'Kerberos for the Cloud [K4C]).

Sidecars:

Sidecars interoperate with User host workloads and with the AMTD platform. CHIPS technology has been incorporated into a lightweight open source networking proxy called Envoy. Envoy, a popular proxy developed by the Cloud Native Computing Foundation (CNCF), performs networking functions such as ingress and egress traffic routing, communication protocol translation, and filtering. Envoy offloads these functions from applications so that developers are not required to write code for them. An Envoy proxy may be used in several design patterns, but a common pattern is the "sidecar" pattern which is the pattern used by the instant innovation.

When enterprise application, features, and patches are moved into production, they are deployed as containers, where containers incorporate code that encapsulates the applications, APIs, and all supporting libraries. Common containerized systems include Kubernetes and Docker Swarm, among other such implementations. During deployment of enterprise workloads to production, the DevOps engineer also configures and deploys a Sidecar with each workload defined as the Host Workload. The Sidecar is configured by the DevOps engineer to connect to the host workload as its communications or networking interface to any other workloads with which it needs to communicate and share data. Message traffic, both ingress and egress, passes through the Sidecar on its way to or from the workloads. The Sidecar is a "long running" container that operates in the same computing machine "pod" as its host workload and as such, it performs "inline" services essential to workload operations.

A large number of CHIPs algorithms may be stored in each Sidecar. The Sidecar also contains the MAID for the workload to which it is connected. The Sidecar also contains a proven AES256 cryptographic library which may contain proven cryptography, methods, functions, and Envoy.

In an embodiment, Sidecars listen for inbound messages arriving at ports at a specific host workload IP address, which are known as API endpoints, and filter and route them to the host workload. Sidecars filter and route inbound messages to the host workload, and perform the reverse action for egress messages, such as, in a non-limiting example, response API data to a requesting client workload. The instant innovation adds a custom filter to Envoy so that during message routing, the IP packets pass through the filter and are either encrypted or decrypted, depending on whether the traffic is an ingress or egress message, before moving to the host workload for ingress messages, or to the network for egress messages.

A symmetric encryption key used in this implementation may be built using CHIPS, which collects dynamic elements to produce a random "seed", and the key generation function from the AES256 library. The AES256 library uses the seed to produce the encryption key. The key remains within the Sidecar and is never exposed outside of the container within which it was generated.

In an embodiment, Sidecars may be configured in one of two versions. The first version, an eXceptional Tamper-Resistant APIs (XTRA) protects workloads, APIs, and data within an enterprise network where it is possible for Sidecars to operate with the same configured CHIPS algorithm, and to establish initial trust in workload identities and to sustain that trust from session to session as the workload operates. The second version, K4C has the same capabilities as XTRA, but with additional capabilities to connect and communicate with an AMTD Platform when connections are necessary with workloads controlled by external third parties (which are untrusted workloads) to exchange data.

In an embodiment, the K4C Sidecar may extend the capabilities of an XTRA Sidecar to verify trust in third party workloads within other organizations before a session between them is enabled. K4C is used to verify trust in workloads with which an enterprise would not want to share their internal algorithms due to risk concerns. Building on the foundation of XTRA and CHIPs technology, K4C introduces a trusted three-party security pattern where an AMTD platform may operate to negotiate secure communication between two organizations with their own workloads and security practices. Each organization's algorithm is known to the AMTD Platform.

In a non-limiting example, the K4C Sidecar may be used to protect the API connections of a bank with an external payment processor. In this non-limiting example, when the payment processor wishes to communicate securely with the bank, the payment processor may use a locally-configured CHIPs algorithm to encrypt all communication to the AMTD Platform. The AMTD Platform may receive the encrypted message and recognize the MAID of the sending workload and use its copy of the same algorithm to generate a key. The key may then be used to decrypt the inbound message to read the identity of the bank with whom the payment processor wishes to connect. The verified MAID and successful decryption allow the AMTD Platform to trust the payment processor. The AMTD Platform generates a session key for the payment processor to use and stores the key with strong encryption and access control mechanisms, ensuring the security and integrity of the generated keys.

The payment processor may decrypt the response message from the AMTD Platform and retrieve the session key. The payment processor then sends a message to the bank workload. This message is encrypted with the session key and the bank workload must use its locally-configured CHIPs algorithm to send an encrypted message to the AMTD Platform requesting the session key. The AMTD Platform repeats the verification process that it used for the payment processor to verigy trust in the bank workload and retrieves the session key, which has been stored locally for the session between the payment processor and the bank. The session key is then returned to the bank in an encrypted message.

The bank workload decrypts the message from the AMTD Platform, finds the session key and decrypts the request message received from the payment processor. The bank and payment processor use the session key to exchange encrypted messages until the session closes and the session key is deleted. With K4C, workloads in different organizations must register their public facing workloads with the AMTD Platform, but the workloads do not need to share any sensitive information with each other.

If the MAID from either workload is not verified by the AMTD Platform, then the connection process is aborted and a session does not occur.

Sidecar Capabilities

Deployment—For a security innovation to be used and well-accepted, it must be simple to deploy. Current methods of deploying TLS and mTL communication encryption, which is the de facto standard across the internet at this time, are complicated, required multiple steps, and are difficult to implement without error. These implementations require highly-skilled developers and DevOps engineers and external services such as automated certificates authorities, certificate managers, key management systems, and secrets managers. As a result, configuration of these protocols is time consuming and costly.

Sidecars are deployed by enterprise DevOps engineers responsible for infrastructure operations and application deployment. The instant innovation simplifies the deployment of SEE™ end-to-end encryption capabilities provided by CHIPS™ technology for both XTRA and K4C Sidecars. Low-friction configuration and simple deployment of a Sidecar as a container image pulled from a container repository enables fast and error-free deployment by a DevOps engineer after editing a YAML file.

Container Portability

Container systems such as Kubernetes and Docker have become popular choices for enterprises moving to the cloud. In addition to their efficiency and dynamic load scaling performance, containers promised enhanced portability, which is the ability to move containers to any other cloud environment. However, that promise has been difficult to realize because large commercial clouds attach many supporting cloud services to containers to enhance their performance. These services end up "binding" containers to a specific cloud vendor because porting them to another cloud requires building and configuring a new set of cloud services.

In a non-limiting example, containerized workloads become reliant on vendor cloud services such as certificates managers, key managers, and secrets managers for workload and identity services. Portability has been constrained by the current identity and secrets associated with Public Key Infrastructure (PKI). In another non-limiting example, workloads with PKI certificates must be within the same network as the Certificate Authority (CA) that issued the certificates. Each certificate has two keys (a public key and a private key) that must be securely stored. Additional secrets, such as API keys are also necessary to achieve authentication.

The instant innovation breaks these constraints and enhances the portability of containerized workloads because the Sidecars have no dependency on PKI. The instant innovation equips workloads to carry their own identity management service (the MAID processes) and its own secrets management (the CHIPS technology and high frequency key rotation), thereby enhancing container portability to other cloud environments.

End-to-End Encryption

Current transport security protocols, such as Transport Layer Security (TLS) or mutual TLS, although in wide use, are not supported everywhere in the cloud. The TLS protocol can be terminated at the entry to commercial cloud environments. These protocols rely on automated PKI identity certificates to complete a multi-step handshake and key exchange process at each session, which adds latency to the communications.

The PKI certificates that are issued to workloads as identity credentials originate form automated, low-level, intermediate certificate authorities and there is no vetting of the workload entity receiving them. Certificates are issued at the speed and scale necessary to enable TLS and mTLS automated connections, rather than ensure identity trust. However, these identity certificates lack a chain of trust in the workload identity. The chain of trust only extends from the root CA to the CA issuing the certificate and not to the workload itself. No vetting of the workload identity occurs and each time a certificate expires and is replaced the workload receives an entirely different certificate and appears to be an entirely new identity. No traceability to its prior identity certificate exists. The result is that TLS and mTLS for cloud workloads fail to meet Zero Trust principles established by the US NIST.

The CHIPS protocol and the MAID enable Sidecars to produce an end-to-end encrypted (E2EE) communication channel or a hardened tunnel between verified and trusted workloads at every session. The hardened tunnel blocks all MITM attacks and ensures data confidentiality and integrity over the entire route between the workloads. Only messages between the Sidecars of trusted workloads can pass decryption and be read by either workload endpoint.

Layer 4 or Layer 7 E2EE

The E2EE performed by the Sidecar can be configured by the DevOps engineer at the time of deployment. Layer 4 of the OSI network model is the layer where individual packets of information are encrypted and decrypted. The contents of the packets are completely opaque to any transport infrastructure, with the exception of a network load balancer, that handles them as they move between two workloads in different environments. In some embodiments, encryption and decryption of messages at the application layer is preferred because the enterprise uses an application load balancer (ALB). The ALB needs to read the message headers to do its job. Sidecars may be configured to encrypt and decrypt message bodies but not message headers at layer 7, avoiding impact on any ALBs.

Blocking all Malicious API Traffic

The E2EE provided by the Sidecar provides an inherent threat prevention function that automatically blocks all untrusted or malicious traffic that may attempt to reach client or server workload endpoints, such as, in a non-limiting example, API endpoints. Messages that arrive at Sidecars and fail decryption are rejected and dropped. Messages from untrusted sources or those of malicious intent do not receive a response from the Sidecar. To the message sender, it appears as though the message disappeared and never reached an endpoint, which provides significant security value in that it deprives an attacker of any knowledge, including the fact that the endpoint even exists.

Many Algorithms

It is likely that at some time a sophisticated threat actor may obtain a sidecar and bypass some security features to successfully reverse engineer it, discovering the CHIPS algorithm. To prevent this, Sidecars contain tens of thousands of CHIPS algorithms. But only one is used by the Sidecar to build the symmetric key used to encrypt/decrypt message with other trusted workloads. That algorithm is only identified in the YAML deployment file. The DevOps engineer selects a specific algorithm at the time of Sidecar deployment. Reverse engineering would disclose the large number of algorithms stored in the Sidecar, but it would be infeasible for an attacker to guess the specific algorithm used or to sequentially try each one without detection of their activity.

URL Checking

The CHIPS algorithms are sensitive to changes in the public URL locations used to collect dynamic elements for seed generation. These URLs are under the control of unrelated third parties, and from time-to-time those parties may alter the URL location for unknowable reasons and without notification. Usually, these changes include automated "redirects" from the old URL to the new one. Nonetheless, the change in a URL used by a CHIPS algorithm could interrupt the function of the Sidecar. The instant invention includes a method by which the URLs used in any CHIPS algorithm are routinely checked to confirm that they are still accessible and producing dynamic elements. If any CHIPS algorithm is no longer accessible and producing dynamic elements, the instant innovation removes the affected algorithms from the list of available CHIPS algorithms.

Licensing

Sidecars encapsulate the code of the instant innovation including all possible functions. The use of any function and the time period of allowed Sidecar use are defined in license software that is deployed with the Sidecar. When a Sidecar is started, its license is checked to determine if the time period of use has expired and to control the response if expiration has occurred. Responses include "shutdown" and "meter". In a non-limiting example, the shutdown response terminates the start-up and prevents further use of the Sidecar. The Meter response allows continued use of the Sidecar but its session use is logged and reported to an AMTD platform. Meter is an important response because undesirable termination of Sidecars would abruptly interrupt business operation of the host workloads. Additional responses and features that are enable or disables by the licensing software may include, but are not limited to, K4C, Fault Tolerance, API Discovery, and Microsegmentation.

Fault Tolerance

Due to the inline performance of the Sidecar, reliability is of paramount importance. The failure of a Sidecar to successfully perform encryption and decryption of messages would interrupt and block workload operations. Such a failure might occur if the public URL used in the CHIPS algorithm was inaccessible for any reason, such as, in a non-limiting example, if the web server was offline or not operational. To overcome this possibility, fault tolerance, defined as failover, code has been added to the Sidecar implementation. The fault tolerance operates on the assumption that a public URL that is unavailable for one workload is also unavailable for the other workload in the session, as well. In this implementation, client and server sidecars cannot both build a key. In this situation, the Sidecar is configured to use several back-up algorithms. In a non-limiting example, a typical implementation would consist of a primary algorithm and two back-up algorithms. When a Sidecar needs to build a symmetric key at the start of a session, it simultaneously builds the primary key and the backup keys. It uses the primary key if it is successfully built, but if not, then the Sidecar may use a first secondary key, and if the first secondary key cannot be built the Sidecar may revert to using the final backup key to establish the E2EE communication channel. This process adds a small amount of latency to the security model for workload operations, but prevents the interruption of workload operations.

Automated Error Handling—Synchronization

It is possible that the generation of two keys by two different Sidecars does not produce an identical match because one or more dynamic elements changed in the short time that each Sidecar built its key. This may also be likely if the two workloads are separated by a large distance where latency has an impact. When a decryption failure occurs and the message is from a known trusted source, such as where the MAID is verified, the default response is for Sidecars to repeat the key generation utilizing the same algorithms.

Anti-Sniffing Protection

In addition to the Fault Tolerance capability herein described, visiting and scraping dynamic elements from multiple URL locations simultaneously also inhibits the ability of threat actors to learn of URLs used by a Sidecar through port monitoring. Port monitoring is used by threat actors to "sniff" unencrypted traffic and could possibly allow an adversary to detect the dynamic elements when an algorithm runs and associate those dynamic elements with a site. Although the entire XML page is read by the algorithm, security is enhanced if multiple URLs are read to confuse any threat actor sniffing as to which dynamic elements are actually used in the algorithm. The result is to obfuscate the valid URL and data within a larger amount of traffic.

Isolated/Private Environments

In some use cases the public Internet is not available where Sidecars would need to operate. In a non-limiting example, spacecraft in earth orbit or remote terrestrial locations that lack reliable connectivity or are disadvantaged in some other way. In these cases, the instant innovation provides the ability for customized CHIPS algorithms that would obtain high entropy dynamic elements from private sources in the available networking environment. In these instances the AMTD Platform has the capability of use with private versions of the AMTD Platform web server.

Time Format as an Algorithm Dynamic Element

When access to the Internet to acquire dynamic elements from public locations is limited or non-existent. It is necessary for the CHIPS algorithm to retain the capability to generate a dynamic seed from available local information. To achieve this capability, the instant innovation adds an additional term to the CHIPS algorithm to alter the formatting of the time data so that a standard time measurement is not used. In a non-limiting example, a standard time measurement might be in the sequence M:D:Y:Hr:Min:Sec. However, the algorithm may require this data in a re-ordered format such as M:Sec:Yr:Min:D:Hr or alternatively may concatenate the string. Also the time measurement is converted to a string of printable characters.

The time measurement intentionally lacks accuracy, for example the time measurement must not be specified to the second, to avoid synchronization issues with other Sidecars key generation process.

In addition to modifying a workload endpoint's time measurement to reduce accuracy and the order of the measurement units, the algorithm may require adding or subtracting a fixed amount of time, or reversing the order of printable characters in specific time unit segment of the time string.

Hopped Passwords and Source Rotation

In an embodiment, the Password Hopping System (PHS) provides for automated construction of customized passwords according to a hopping algorithm created by a User and known only to the User and the Algorithm Server. This automated construction repeatedly customizes user passwords according to a Formula by combining and altering the dynamic information by means of Formula rules. A Formula rule constructs or transforms a part of a password. In a non-limiting example, multiple Formula rules specify multiple parts of a hopped password or specify the order in which the parts are assembled into a single password. Formula rules may identify one or more time-variable data character strings from one or more information sources. Formula rules may also include one or more specific non-variable, or fixed, character strings added to the Formula to increase password entropy. Formula rules may also define the substitution, transformation, addition, subtraction, concatenation of the time-variable data or apply other similar methods to the time-variable data, such as, in a non-limiting example, reversing the spelling order. In an additional non-limiting example, another Formula rule might specify the prepending or appending fixed, personalized, character strings to the dynamic character strings, whether the dynamic character strings are altered or unaltered, that may be obtained from dynamic information sources. In a non-limiting example, another Formula rule may construct an easily remembered "site tag" in the password character string to indicate the TPV site at which the password is used and to construct unique passwords for each site using a single Formula, and thus avoiding the brushfire vulnerability present with many passwords.

In an embodiment, a Formula rule may include specifying the order in which Formula rules are applied in password construction resulting in greater variability of passwords from a single set of Formula rules. And yet another Formula rule may further specify the order of the various password parts constructed from other Formula rules of the password, such as those parts constructed from the non-limiting rules previously described. For example, the altered or unaltered dynamic string parts and any fixed string parts, such as a user secret word, or site tag, may be arranged in a variety of serial orders.

In an exemplary embodiment, automated collection and storage of dynamic source information by the Algorithm Server may proceed according to a schedule, such as storing a copy of dynamic source information at a specific time, such as a news headline captured on a timed interval. In this embodiment, the automated retrieval and storage of dynamic source information may be obtained at scheduled times specified by a User defined hopping Schedule. In an embodiment, the automated retrieval and storage of dynamic source information by the Algorithm Server may also be scheduled by the source of dynamic information, such as when news headlines are updated or refreshed or an email newsletter is sent and received in an inbox, rather than user-specified. In non-limiting example, the automated retrieval and storage of dynamic source information by the Algorithm Server may also occur at the moment that a User logs in at a TPV web site. In a non-limiting example, this automated retrieval and storage may occur at the moment of authentication request. This is a non-limiting example of an "on-demand" hopping schedule determined by real-time user activity. In yet another non-limiting example, the automated storage of dynamic information may occur at times scheduled by the PHS, such as when it generates time-variable information such as an email newsletter, composed by the PHS, and sent to a User email inbox. This PHS-generated information may be created at times scheduled by the User defined hopping Schedule.

In an exemplary embodiment, the User may obtain new or recent dynamic information from the specified information source and apply their Formula to construct their new password independently from the Algorithm Server. The Algorithm Server, operating automatically and independently, obtains the same dynamic information and performs the same password construction activities. The Algorithm Server and the User do not require intercommunication of a change in the password. No synchronization between the two is necessary. Both know the change based on the pre-configured Formula and hopping Schedule. In a non-limiting example, the PHS may provide timely electronic notification of dynamic information to the User at their request. Source information is hidden in plain sight in the notifications, as it would be in its original form. In an embodiment, notification methods include email or text messaging to mobile devices and provide users with a redundant means of locating the time-variable data used by their Formula.

In an exemplary embodiment, the PHS includes an API to simply, quickly, and securely authenticate users to their TPV account via the TPV web site login page. In this embodiment, the PHS, through its API, performs the role of a supplemental authentication service and controls specific Authentication Server-to-Algorithm Server communications during a User login session at the TPV web site. The API provides a secure interface to PHS servers for several user-initiated functions while they are at the TPV web site. In this embodiment, TPV Customers may register with the PHS "password as a service", create a User Formula and pair their TPV account, and login to their TPV customer account with the PHS. In this embodiment, the user may also add a TPV site to a User's PHS service account and pair the user's TPV site and TPV account with a User Formula, and they may upgrade their PHS service during the Add Site process if their current service lacks the capacity for additional TPV sites. In this embodiment, any account-Formula pairing occurs only once on initial authentication access and should include automatic forced password reset the next time the User logs in directly through the TPV Authentication Server. Because the User's old TPV account password remains stored in the TPV Authentication Server, it should not be used for authentication. Marking the account for password reset prevents a security vulnerability caused by leaving an old unused password in the Authentication Server.

Enhancement and transformation rules are applied to the dynamic information from three to five public sources to construct unique dynamic passwords that can be easily and simultaneously known by both the User and Authenticator without communication of the password between them. Uniquely, the underlying dynamic information used in password hopping is hidden in plain sight, with Formula rules and dynamic data sources known only to the Algorithm Server and the User.

Not only can a vast number of dynamic information sources be used for Formula source information, more obscure dynamic data sources such as a corporate newsletters or industry publications can be used to further heighten security. Even the rules themselves can be hopped to increase security measures. With password hopping the most effective security measure is the hopping frequency, which is defined as the scheduled number of hops and the scheduled time intervals for initiating each password hop. Secure password hopping occurs as a background process without a need to communicate the one or more newly constructed passwords resulting from the hopping activity to the user. The method of hopping passwords with time-variable information hidden in plain sight is a departure from existing conventional password security approaches.

In an exemplary embodiment, a user may log into an Algorithm Server and specify a particular set of conditions to create Formula rules. The conditions specified by a user may include, but are not limited to, the source of dynamic data, the coordinate position within the dynamic data source of time-variable data to be used, the desired interval at which the hopping algorithm is triggered, and third-party web sites where the resulting hopped password is to be used.

The user may prefer to manually collect the time-variable data and apply Formula rules to determine a current Password. The user may then log into his account at any third-party Authentication Server and update the existing Password with the newly created Password. The user may then log out of any third-party Authentication Servers and use his new password to login at a later time. Unfortunately, manually hopping passwords is equivalent to current static passwords that change only as frequently as the user changes their password and provides no real security benefit to the user.

In an exemplary embodiment, an automated service is preferred to actively manage the password hopping activity for users. To perform this process, the user would establish an account with the PHS "password as a service" server, the Algorithm Server, and define Formula rules through which the hopping activity would be performed, as well as identify the dynamic information sources of choice for the user. In a non-limiting example, the user also specifies a desired hopping schedule (date and/or time interval) of a specific time-period and provides the website address(es), in the form of one or more URLs or domain names, of user private content where the passwords are needed to authenticate and gain access.

In this embodiment, the "pairing" of Formulas and hopping Schedules to a plurality of User's accounts at a plurality of TPV web sites ensures that authentication to the right TPV web site account occurs. Pairing requires the verification of a User's TPV account credentials upon first use of the password hopping service with the TPV Authentication Server. Once the pairing is complete, authentic user passwords provide access to their TPV account and private content.

At the expiration of the time interval, the Algorithm Server collects new dynamic information from a specified information source and stores it for use in password construction at any time during the current hopping interval. When the user connects to TPV Authentication Server to login, the Authentication Server calls the Algorithm Server via an application programming interface (API) utilizing a unique private key. The Algorithm Server verifies the key and presents to the user (via the TPV web server) a login page to collect the username and current hopped password. Both credentials submitted by the user are only received by the Algorithm Server and the submitted password is compared with the authentic password that is instantaneously constructed (using the Formula rules and stored dynamic information) by the Algorithm Server. If the passwords match, then the Algorithm Server authenticates the user to the Authentication Server (via the API) and the user is granted access to their private content within the TPV web site.

This process continues without any further intervention from the user and dynamic information is collected and stored many times during a user's online absence from a particular TPV web site and Authentication Server depending upon the chosen hopping Schedule.

In this embodiment, when the user next visits a TPV site and authentication is required, the user may easily compose the correct password by knowing the Formula rules that the user previously specified and visiting the easily available information source to identify the time-variable data at the coordinate position previously specified. The result is a user authentication with a strong dynamic password that may be frequently replaced. And because of the potentially short lifespan of the dynamic password, sensitive user data is far more invulnerable to exploit if the password is stolen or exposed. The exposure to the loss or theft of the password is also limited by the secrecy of the user-specified time interval for the hopping activity.

In a non-limiting example, a password subject to a hopping schedule specifying an interval of twenty-four hours would be replaced with a unique random password six times in a week. A password subject to hopping on a twelve-hour interval could lead to thirteen passwords in the same week-long time period.

The source rotation for the public sources utilized to create a secure, hopped password by the PHS begins with identifying three to five public sources. The system may create a variable in the algorithm for the public source utilized. The system may then rotate the value of that variable by rotating the generation of that value by utilizing each of the three to five public sources in succession. The rotation or hopping cycle for the source variable may be daily, weekly, or on any other specified time period. If an error occurs because a source is not available, then rotation to the next public source in the list is triggered automatically and the algorithm would move to the next public source in the list to generate the value for the secure, hopped password hopping step.

API Discovery

Although untrusted ingress traffic fails decryption at the Sidecar and is rejected, the events are logged by the Sidecar. Rejected messages include identifiable header information that associates the message with the sender. Before the message is rejected, the Sidecar logs the header data and this log is searchable to identify legitimate API messages from other enterprose workloads that may be operating without a Sidecar. These may be "shadow" PI's that were created during development or APIs from old or obsolete code that belongs to the enterprise and was never discovered or documented. Discovery of unknown but legitimate to the enterprise APIs is possible by this method. Since all ingress messages are logged, a complete and thorough discovery of enterprise APIs occurs as a consequence of normal Sidecar operation. The discovery is continual and over a long period of time can identify all enterprise APIs.

Identifying Sources of Malicious Traffic

Another reason for decryption failure and message rejection is the source of the message as untrusted or malicious. Culling the legitimate undiscovered enterprise APIs from the log of decryption failures leaves a remainder of untrusted and malicious sources that attempted to attack a workload, such as, in a non-liming example, an API endpoint. These identities can be provided in a report to be used by other enterprise security tools, such as a network blacklist, to block future malicious attack attempts. The logs of untrusted connections can be used to identify threat actors and generate other defensive response actions.

Micro-Segmentation

Segmentation of networks is an important security feature that prevents unauthorized access to critical network resources. Segmentation of a network may occur at different layers of the OSI network stack using a variety of access control methods. Segmentation isolates areas of the network and computing infrastructure to prevent lateral movement of threat actors that have penetrated perimeter security defenses.

The instant innovation enables users to segment their containerized workloads at a highly granular level, independent of any other network segmentation that may or may not exist on the network. The instant innovation micro-segments containerized infrastructure to segments as small as two workloads.

When micro-segmentation is enabled in the Sidecar license, the Sidecar is able to accept additional CHIPS algorithms identified in the deployment YAML file and these algorithms are matched to specific IP address ports. The ports are associated with a group of other workloads that require protection by isolation. In a non-limiting example, a payment processing application may work with sensitive personal identification information (PII) or financial account information. In this example it is necessary to isolate all of the workloads performing payment processing and assign specific IP port addresses for the payment processing app. A Sidecar YAML file would isolate and protect the payment processing workloads by assigning a different CHIPS algorithm, which produces a different key, for ingress and egress encrypted messages passing through the specified ports. All other messages that may pass between workloads through other ports would be encrypted with the key from the workload's primary CHIPS algorithm. Sidecars can support the operation of multiple micro-segments by configuration of the port assignments and CHIPS algorithms listed in the YAML file.

Encryption of private data at rest is a common security standard. In most networks accessible to external users, the private data is contained in a database server and encryption may be applied in a variety of ways, such as the full database, database tables, database columns, or database rows. Typically, any encryption requires a key, initialization vectors and cryptographic ciphers to convert plain text information to cipher text. In an embodiment, the Algorithm Server may provide the time-variable parts of a User's hopped password to the PHS for transformation into a "seed" for creation of a symmetric encryption key. This transformation may use one of several available cryptographically secure pseudo-random number generators for encrypting their private data. Private data is that data either held by the PHS servers or by the TPV servers. In this embodiment, the PHS uniquely produces personalized encryption of user private data. Personalized encryption increases user privacy and information security because their protection is not reliant on system-level security policies or practices or a central master key, which if stolen or misused compromises the entire database in a variety of well-known ways. Rather the User privacy and information security are built on choices the User makes. In this embodiment, the PHS may combine the User seed with additional randomly generated characters, such as, in a non-limiting example, a PHS seed, to increase the entropy of the seed for the cryptographic key. In an embodiment, the Algorithm Server encrypts the combined User and PHS seeds and transmits them to the TPV Authentication Server via the PHS API. The TPV may then add additional characters, consisting of the TPV seed, to the received data to arrive at a final seed that generates the encryption key to encrypt/decrypt user private data. For decryption, the key is based on seeds used in the prior login session because those were the seeds used for the encryption of the user private data. For encryption, the key is based on seeds used in the current login session. In this embodiment, the user private data can only be de-ciphered by a TPV during an online session where the User has been authenticated via the PHS—seeds for the key from the TPV, PHS, and the user are needed to reconstruct the key. This reduces the exposure of User private data in time and its access by others. The data is not accessible to TPV employees or their systems unless the User is logged through the PHS. The only time the TPV's API call to the PHS is recognized and acted upon is at the moment of User authentication to the TPV. And because the API must start with a User login, the PHS is unable to initiate the API activity independently. In this embodiment, the User conducts business with the TPV via the TPV servers, and when the session closes either by User logout or time-out, the User data within the TPV is encrypted and stored with a new secure cryptographic key. In this embodiment, all API communications are conducted and secured using Transport Layer Security (TLS) protocols. All generated key components are destroyed by both the TPV, which occurs at end of session, and the PHS, which occurs at end of authentication.

In an exemplary embodiment, the PHS includes an administrative service whereby the system configuration may be securely accessed and configured. Administrative services include configuration of server performance variables, performance monitoring, troubleshooting technical problems, data backup, system security, and user support.

Turning now to FIG. 1, at 100, this figure presents an illustration of the top-level technical architecture of the instant innovation's Secrets, Authentication, and Machine Identity (SAMI) system consistent with certain embodiments of the present invention. The interconnecting lines indicate that various components may perform at various times. Some may operate at registration when identities are established; others may operate intermittently as needed, such as workload interactions; and still others may operate in real-time during machine-to-machine interactions.

In an embodiment, the technical architecture may be a recursive functional design. Similar or identical functions may be repeated by the same apps at different levels of the architecture, yet for different purposes.

Figure 2:
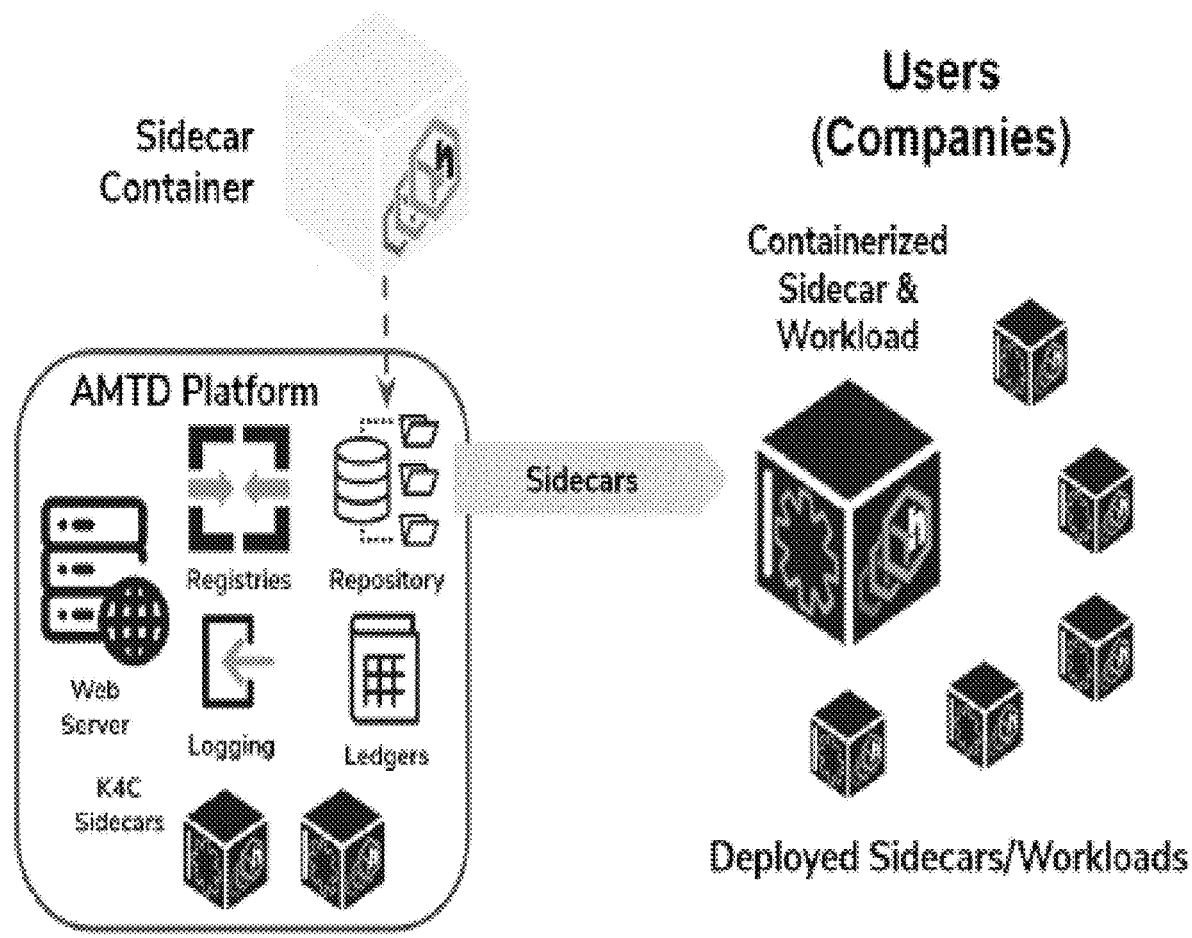
FIG. 2 is a system diagram describing the architecture of the AMTD platform and the deployment of Sidecars to one or more consistent with certain embodiments of the present invention.

Turning now to FIG. 2, at 200 this figure represents a system diagram describing the architecture of the AMTD platform and the deployment of Sidecars to one or more containers consistent with certain embodiments of the present invention. In an embodiment, a "Sidecar" is code that is "plug and play" with machines and workloads. A Sidecar replaces the traditional static key that would be written in code to trigger an external function such as an API call. A Sidecar is issued to a workload by the SAMI Machines Registry at registration, and each issued Sidecar is preconfigured by the Secrets Manager so that it is unique to a workload.

In an exemplary embodiment, the Web Server publishes web pages with random high entropy dynamic elements at a variety of URLs, each of which may be associated with an organization such as a company UID. The contents of each web page are removed and republished with new dynamic content at a high frequency, where the publication frequency may be configured by the system user but is commonly set at a one minute frequency of publication. The MAID registry maintains a list of all registered sidecars/workloads and their associated owner such as through a company UID. The algorithm registry or registries may contain all CHIPS algorithms and the users associated with their use. The logging function logs and records all activity in the AMTD platform. The ledger functions record all activities associated with workload and session use, the metering of usage time, associated with all users.

The container repository on the AMTD platform stores and delivers Sidecar container images, licenses and YAML files to registered users. Container images are version controlled and stored by version number. Access to the Container Repository is strictly controlled and is typically automated access at the time DevOps engineers at a user location deploy their host workloads.

Figure 3:
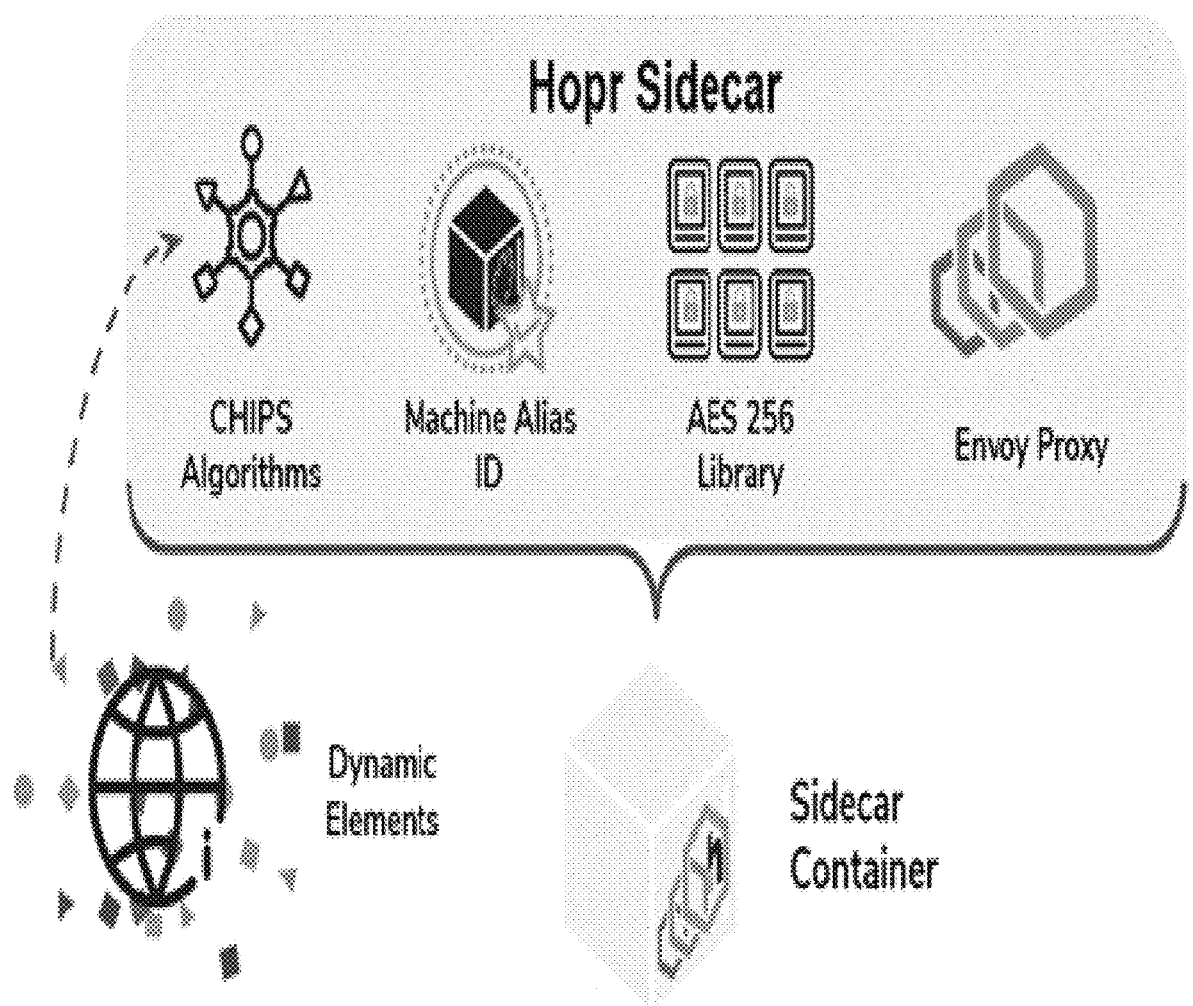
FIG. 3 is a system diagram describing the internal components of a Sidecar container consistent with certain embodiments of the present invention.

Turning now to FIG. 3, at 300 this figure presents a system diagram describing the internal components of a Sidecar container consistent with certain embodiments of the present invention. In an embodiment, each Sidecar is assigned a Sidecar ID when it is issued; the Sidecar ID is used for logging. Each Sidecar may include the CHIPS™ logic, process, and security so that it can be easily reused and installed by DevOps teams with the least amount of manual configuration. The installed Sidecar man only be triggered by and interoperate with its host workload and the SAMI Session Manager.

In an embodiment, a Sidecar contains CHIPS algorithms that seek and return dynamic elements for secure message processing. The Sidecar may also contain the Machine Alias ID for the system to which it is deployed. The Sidecar may also contain the AES256 encryption library to facilitate encryption actions. The Sidecar may also contain an envoy proxy to facilitate machine access and processing.

In an embodiment, a Sidecar receives a session token and session encryption key inside an encrypted message (which is encrypted with the Workload's ephemeral secret) from the Session Manager. The Session token includes encrypted session parameters such as but not limited to, date, time, session time limit, workload endpoints, and session log ID. A Sidecar uses its session token to encrypt messages to the sidecar of the respective workload.

In an embodiment, each sidecar decrypts received messages, verifies the parameters, and passes the workload-specific data to their workload; a Sidecar monitors session time and alerts the workload as the session expiration time approaches. A client Workload may request session extension through its Sidecar, to the Session Manager, and then to the resource Sidecar.

In an embodiment, each Sidecar contains micro-vaults, each of which contain the CHIPS™ algorithm for the workload, an encryption key, and the hopping cycle. Some parts of the workload CHIPS™ algorithm may be hopped and updates may come from the AMTD Platform. Each micro-vault may include at least one part of CHIPS™ algorithm, its hopping cycle, and the key for the next micro-vault (in the CHIPS™ algorithm assembly order).

Figure 4:
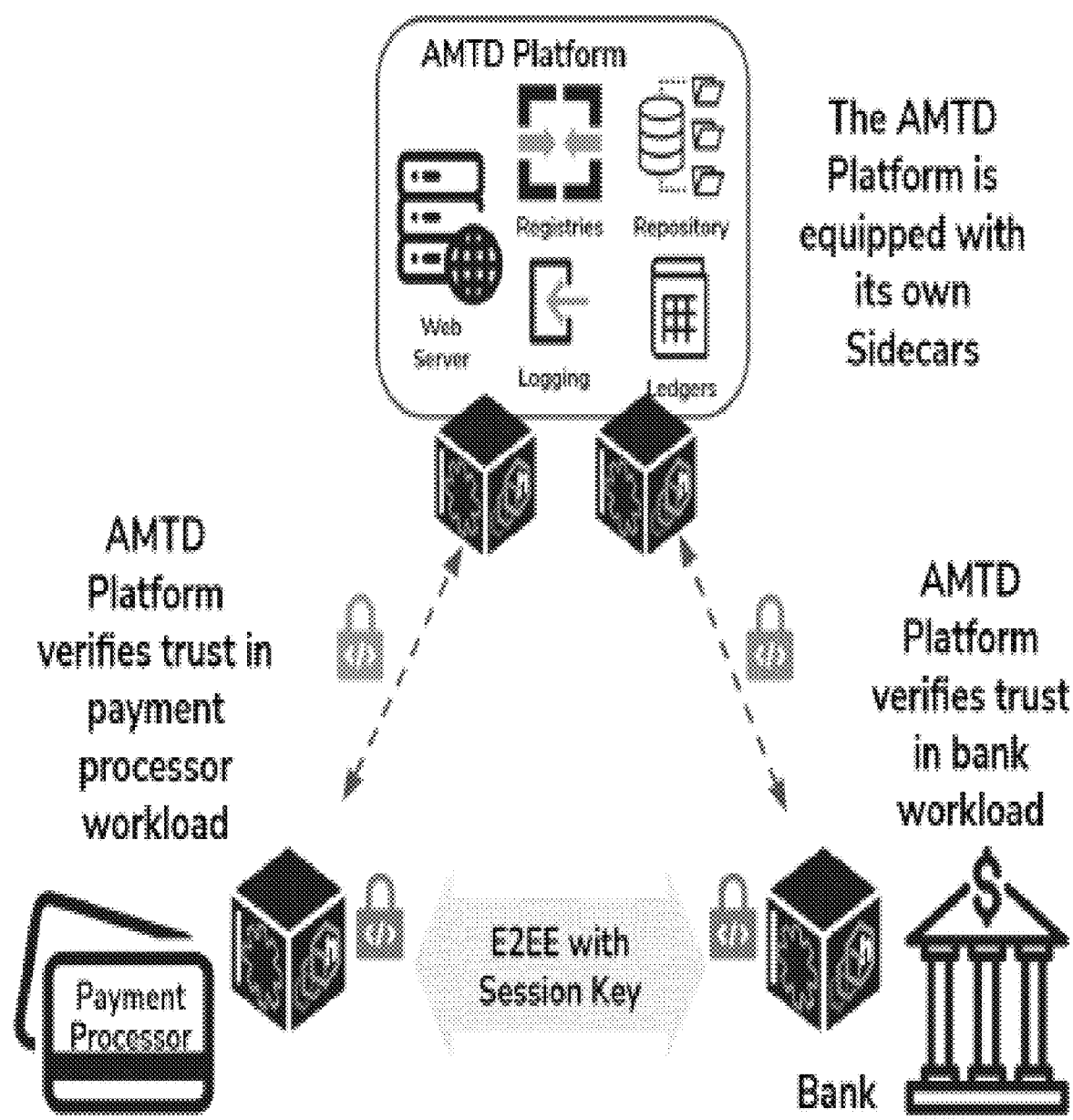
FIG. 4 illustrates the operation of the AMTD platform consistent with certain embodiments of the present invention.

Turning now to FIG. 4, at 400 this figure presents the operation of the AMTD platform in facilitating a secure messaging transfer in a payment processing example consistent with certain embodiments of the present invention. In an embodiment, the AMTD platform utilizes a K4C container to protect the API connections of a bank communicating with an external payment processor. In an embodiment, when the payment processor wishes to communicate securely with a bank, it uses a locally-configured CHIPS algorithm to encrypt the payment processor communication to the AMTD Platform. The AMTD platform receives the encrypted message and recognizes the MAID of the sending workload and uses its copy of the same algorithm to generate a key and decrypt the inbound message to read the identity of the bank with whom the payment processor wants to connect. The verified MAID and successful decryption allow the AMTD platform to trust the payment processor. The AMTD Platform generates a session key for the payment processor to use and stores the key with strong encryption and access control mechanisms, ensuring the security and integrity of the keys.

The payment processor decrypts the response message from the AMTD platform and retrieves the session key. The payment processor then sends a message to the bank workload, but the message is encrypted with the session key and the bank workload must use its locally-configured CHIPS algorithm to send an encrypted message to the AMTD platform requesting the session key. The AMTD platform repeats the verification process that was used for the payment processor to verify trust in the bank workload and retrieves the session key. The session key is locally stored for the session between the payment processor and the bank. The session key is returned in an encrypted message to the bank.

The bank workload decrypts the message from the AMTD platform, finds the key and decrypts the request message received from the payment processor. The bank and payment processor use the session key to exchange encrypted messages until the session closes and the key vanishes. With K4C workloads in different organizations must register their public facing workloads with the AMTD platform but each organization does not need to share any sensitive information with each other.

Figure 5:
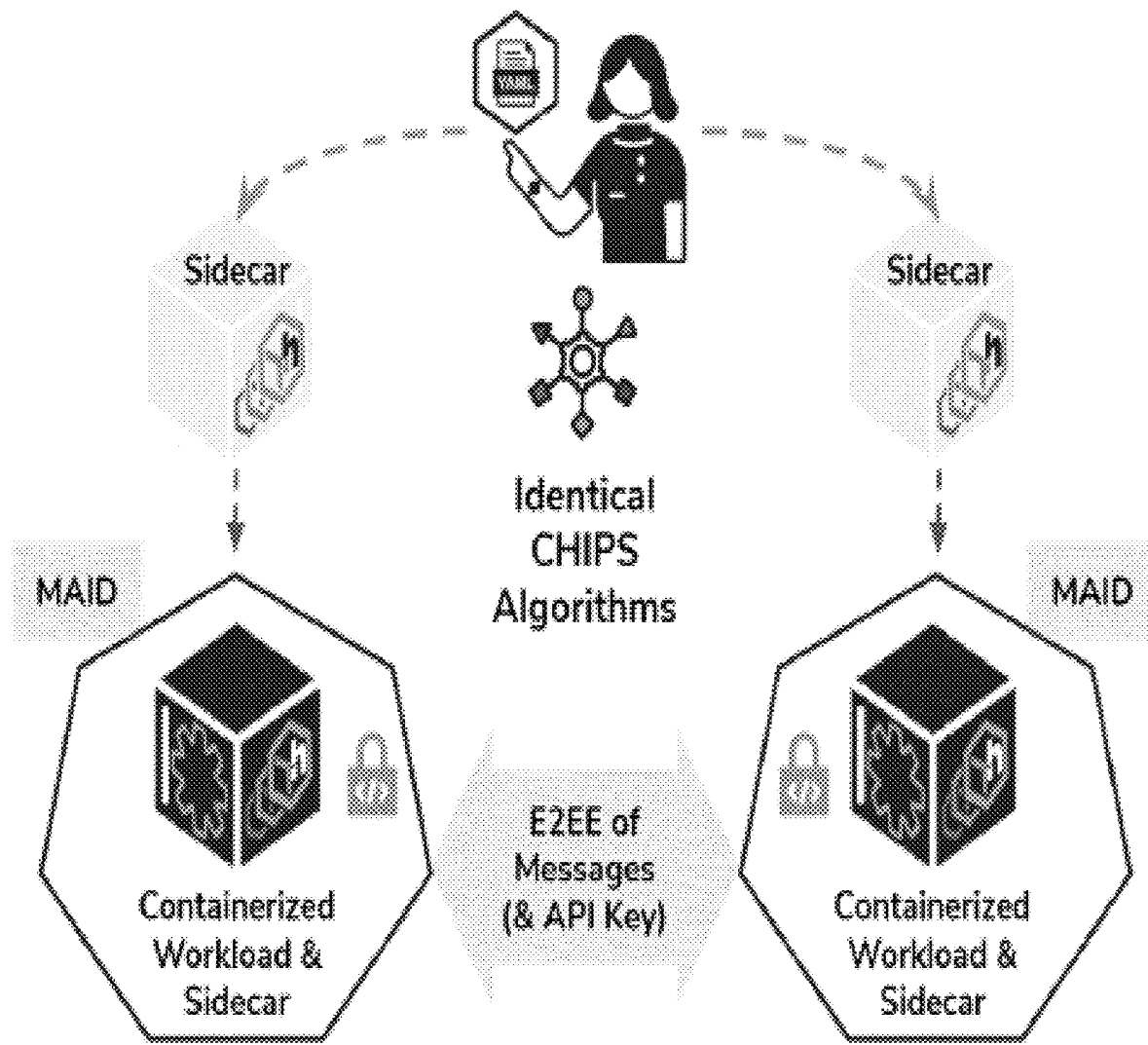
FIG. 5 illustrates the E2EE messaging between multiple Sidecars consistent with certain embodiments of the present invention.

Turning now to FIG. 5, at 500 this figure illustrates the E2EE messaging between multiple Sidecars consistent with certain embodiments of the present invention. In an embodiment, such a deployment might utilize the following process. A DevOps engineer obtains credentials to access the AMTD Platform Container Repository. The DevOps engineer obtains an unconfigured YAML file from the Container Repository and edits so that it matches the port assignment and naming conventions of the containerized workloads, where the YAML file contains a reference to the license for the Sidecar software. The DevOps engineer selects an algorithm unique identifier (UID) and adds that to the YAML file. The DevOps engineer runs a production pipeline to deploy the required workload and the sidecar is pulled from the container repository, configured for a specific CHIPS algorithm and deployed in the pod with a host workload. In production, the Sidecar operates immediately to deliver threat protection with the associated AMTD.

Figure 6:
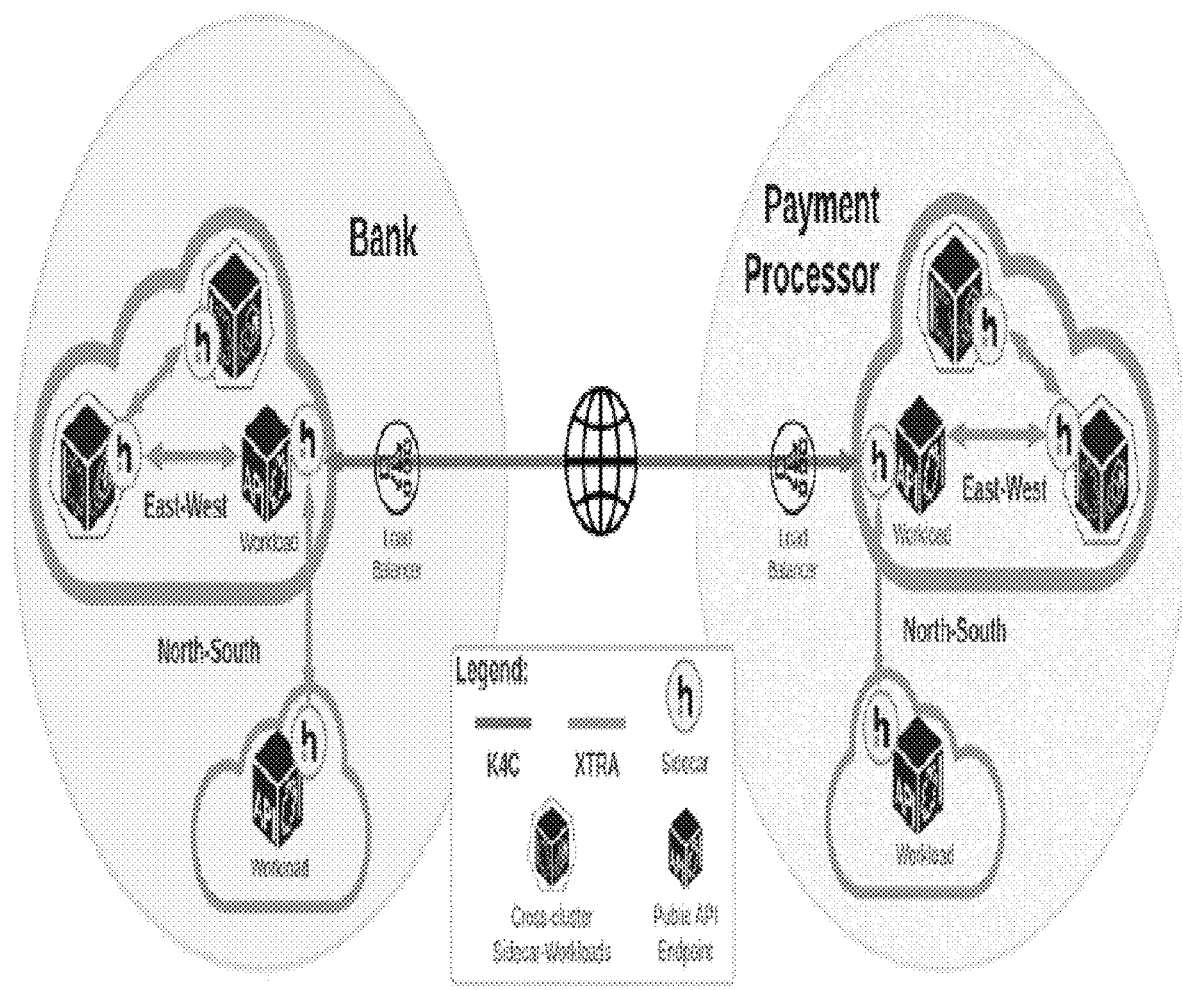
FIG. 6 illustrates the system processing in a non-limiting example of the system performance for secure communication between a Bank and a Payment Processor consistent with certain embodiments of the present invention.

Turning now to FIG. 6, at 600 this figure illustrates the messaging movement in a non-limiting example of the system performance for secure communication consistent with certain embodiments of the present invention. K4C Sidecars operate with all workloads and APIs, both those that are internal-facing and those that are public-facing. XTRA Sidecars operate only with workloads and APIs that operate within an organization. The convention in describing data traffic flows in cloud networking is to describe data as moving North-South (between data centers) or East-West (within a data center).

Figure 7:
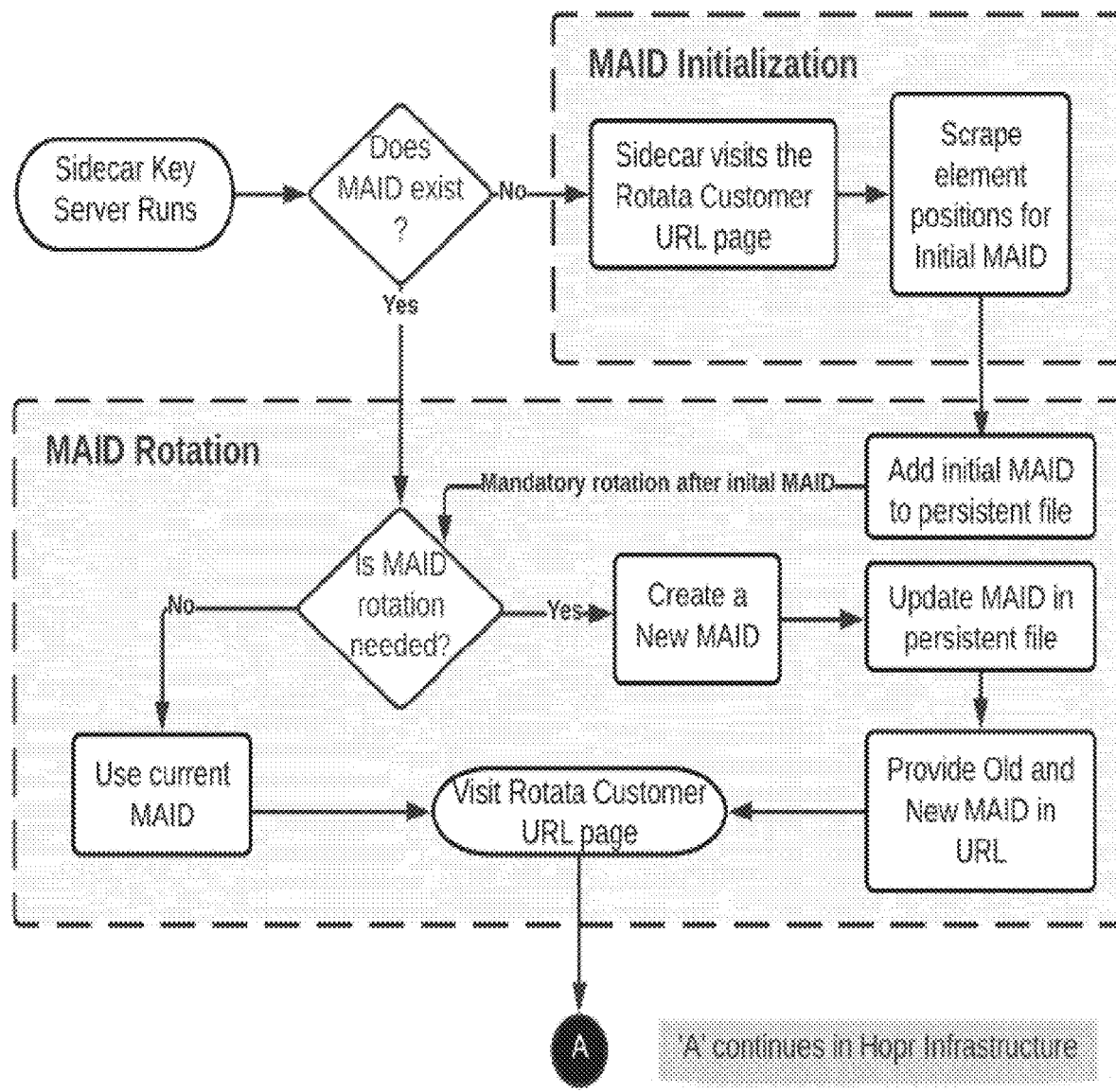
FIG. 7 illustrates the MAID Initialization and Rotation consistent with certain embodiments of the present invention.

Turning now to FIG. 7, at 700 this figure presents MAID Initialization and Rotation consistent with certain embodiments of the present invention. In an embodiment the initial MAID is obtained from the AMTD platform. In this embodiment, MAID rotation is decentralized and performed by each sidecar. The MAID may rotate on either a time basis or a session count basis based upon timing or configuration settings. A persistent MAID file may resides with the sidecar and stores two values; and old MAID and a current MAID. The AMTD platform URL used by the SHIPS algorithm is user-dependent. This helps with metering of user workloads. This provides that only workloads within an enterprise can acquire the same dynamic elements to build an identical secret. External or untrusted workloads controlled by other users will need a K4C solution.

In this embodiment, the AMTD system checks to determine whether a MAID exists or not. If the MAID does not exist the Sidecar visits the Rotata Customer URL page and then scrapes element positions for the initial MAID. The initial MAID is initialized and added to the MAID persistent file. The system requires a mandatory rotation after the initialization of a MAID.

If a MAID exists, the system checks to determine if MAID rotation is required based upon timing or other configuration parameters. If MAID rotation is needed the system will create a new MAID and update the MAID in the MAID persistent file. Both the old and new MAID values are placed in the URL and the user is provided the link to visit the Rotata customer URL page. If however, MAID rotation is not needed the system utilizes the current MAID and the user is provided the link to visit the Rotata customer URL page.

Figure 8:
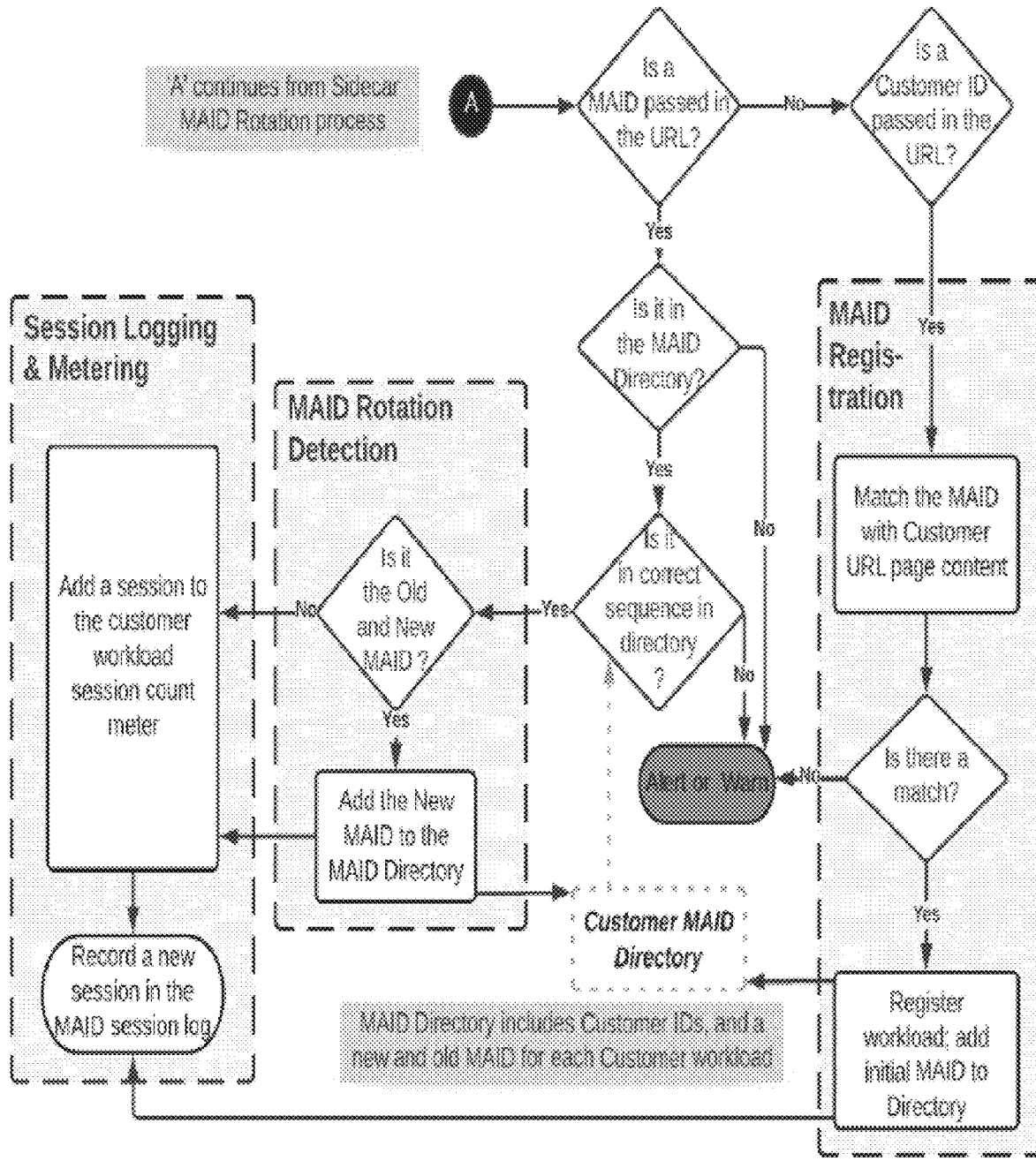
FIG. 8 illustrates secure session processing consistent with certain embodiments of the present invention.

Turning now to FIG. 8, at 800 this figure presents the process for MAID verification by the AMTD platform consistent with certain embodiments of the present invention. In an embodiment, MAID verification may be performed by the AMTD platform. In an embodiment, two prerequisites are assumed for the AMTD platform.

First, the web server must publish pages specific to each user. The Page URL is a derivative of the company UID. The web server must republish pages with new dynamic content at a frequent rate. In an embodiment the frequency rate may be a fixed frequency of a variable based on the service plan acquired by the user.

Second, the AMTD platform establishes the initial MAID even though MAID rotation is decentralized and controlled by sidecars. When the web server publishes the company UID page, the sidecar finds and scrapes the initial MAID from a location on the user page.

When a visit to the web server URL occurs with a company ID in the URL path it is an indication that the visitor is a new sidecar and needs to obtain the initial MAID from the AMTD platform. The sidecar scrapes the company URL page and locates particular characters at predefined page locations, as defined by the company ID seed algorithm, to obtain and build the initial MAID. The company UID is used as a seed to choose an algorithm that identifies page locations used for the initial MAID. Since both AMTD platform and the sidecar know the company UID, the same algorithm is used to determine the MAID on both sides. Once the initial page visit is completed the AMTD platform uses the elements of the page and the seed algorithm to build its version of the initial MAID. It adds the initial MAID to the AMTD platform's MAID directory and the sidecar/workload is automatically registered.

For MAID rotation detection a sidecar notifies the AMTD platform of a MAID rotation by adding the Old and New MAID to its URL path when it visits the MAID URL. AMTD platform detects the rotation from the URL information and adds the New MAID to the MAID directory.

For session logging and metering, once the checks for MAID registration or rotation detection are complete. If a rotation has occurred the MAID directory is updated. The AMTD platform logs the session and increases the session count for the user, which is described as using the metering service. The process of verification by the AMTD platform includes several safeguards that prevent threat actors from spoofing the process with a new MAID and registering it as a legitimate sidecar.

While certain illustrative embodiments have been described, it is evident that many alternatives, modifications, permutations and variations will become apparent to those skilled in the art in light of the foregoing descriptions.

What is claimed is:

1. A system for secure message traffic communication comprising:
   an automated moving target defense (AMTD) platform server device initiating a sidecar container at two or more message traffic endpoints;
   each of said sidecar containers querying a central location to retrieve identical Code Hidden in Plain Sight (CHIPS) algorithms and one or more dynamic secret elements;
   each of said sidecar containers querying a central location to retrieve both lease and time-to-live timing values;
   each of said sidecar containers creating an identical ephemeral symmetric secret value;
   each of said sidecar containers utilizing said ephemeral symmetric secret values to create an original Machine Alias ID (MAID) at each of said message traffic endpoints;
   each of said sidecar containers active to modify or update each of said original MAIDs upon expiration of lease and time-to-live timing values utilizing said identical CHIPS algorithm in each sidecar to create rotated MAIDs;
   said AMTD creating an identity trust chain where each Sidecar rotates its machine alias ID (at a defined number of sessions or an expiration of a defined time period) to a new alias derived from its original machine ID alias, one or more of its previous machine ID aliases, its current machine ID alias, and a pre-established time value;
   each of said sidecar containers active to encrypt message workload utilizing said ephemeral symmetric secret value;
   said AMTD platform transmitting said message workload among said message traffic endpoints;
   each endpoint sidecar receiving said message workload decrypting said message workload utilizing said ephemeral symmetric secret and providing said message workload to a user.

2. The system of claim 1, where the sidecar container comprises at least one CHIPs algorithm, one or more MAIDs, and AES256 encryption library file, and an envoy proxy.

3. The system of claim 2, where each sidecar container is deployed to two or more servers or networked locations for facilitate transmission of message workload traffic.

4. The system of claim 1, where each of said sidecars initializes identical MAID values at the beginning of a secure communication action.

5. The system of claim 1, where each message workload transmission is recorded in a MAID session log in an electronic storage element in said AMTD server.

6. The system of claim 1, further comprising said AMTD server creating and managing a customer workload session count meter to track message workload traffic.

7. The system of claim 1, where said CHIPS algorithms remain within each Sidecar and are never exposed or transmitted.

\* \* \* \* \*